United States Patent [19]

Okamura et al.

[11] 4,339,983

[45] Jul. 20, 1982

[54] CLAMPING DEVICE FOR CLAMPING PLATE-LIKE MEMBERS

[75] Inventors: Koichi Okamura, Fukuoka; Susumu Kusakabe, Takatsuki; Masahiro Yoshida, Yokohama; Fumio Hiraoka, Kadoma, all of Japan

[73] Assignee: Matsushita Electric Industrial Co., Ltd., Kadamo, Japan

[21] Appl. No.: 10,981

[22] Filed: Feb. 9, 1979

[30] Foreign Application Priority Data

Feb. 13, 1978 [JP] Japan .................................. 53/15532
Feb. 13, 1978 [JP] Japan .................................. 53/15533

[51] Int. Cl.[3] ............................................. F16B 15/00
[52] U.S. Cl. ..................................................... 41/466
[58] Field of Search .................. 85/49, 13, 28; 24/36, 24/73 B, 73 D, 94-96

[56] References Cited

U.S. PATENT DOCUMENTS

| | | | |
|---|---|---|---|
| 290,290 | 12/1883 | Traphagan | 85/49 |
| 1,336,193 | 4/1920 | Bryan | 85/13 X |
| 2,283,766 | 5/1942 | Sbicca | 85/28 X |
| 2,586,388 | 2/1952 | Schafroth | 85/49 |
| 2,674,149 | 4/1954 | Benson | 85/13 |
| 2,973,175 | 2/1961 | Appleton | 85/13 X |
| 3,233,730 | 2/1966 | Winters et al. | 85/13 X |
| 3,908,850 | 9/1975 | Jureit | 85/13 X |
| 4,090,337 | 5/1978 | Szekeres | 85/49 X |

FOREIGN PATENT DOCUMENTS

| | | | |
|---|---|---|---|
| 932998 | 9/1973 | Canada | 85/49 |
| 1295047 | 11/1972 | United Kingdom | 85/13 |

*Primary Examiner*—Ramon S. Britts
*Attorney, Agent, or Firm*—Wenderoth, Lind & Ponack

[57] ABSTRACT

The disclosure relates to a clamping device capable of readily combining or disassembling plate-like members such as corrugated boards, etc. for packing cases and the like. The clamping device made of flexible material, for example, polypropylene or the like includes a flat base portion, pivotal members hinged to the base portion, and piercing pieces or claws extending outwardly from the respective pivotal members for forcing the piercing pieces into or withdrawing the same from the plate-like members in an efficient manner.

8 Claims, 8 Drawing Figures

CLAMPING DEVICE FOR CLAMPING PLATE-LIKE MEMBERS

BACKGROUND OF THE INVENTION

The present invention relates to a clamping device and more particularly, to a clamping device for clamping or connecting plate-like members such as corrugated boards and the like especially used, for example, for sealing flap covers of packing cases, etc.

Commonly, it has been a general practice to seal or clamp flap covers of a packing case by applying thereto adhesive tapes, or by winding strings around a plurality of pairs of small disc members respectively fixed to the flap covers by eyelets or rivets for connecting the flap covers together, or by driving staples into the flap covers by staplers.

The conventional means as described above, however, have disadvantages in that to open the packing case thus sealed is troublesome, or re-sealing is difficult once the packing case is opened, or even if re-sealing is possible, troublesome procedures are required therefor.

By way of example, in the packing cases the flap covers of which are sealed by adhesive tapes, surfaces of corrugated boards constituting the packing case are inevitably damaged when the adhesive tape is peeled off, and a new adhesive tape must be used, for sealing the flap covers again. Meanwhile, in the arrangement in which strings are passed around the pairs of small discs fixed to the flap covers, much labor is required for assembly of the packing case due to the increased number of parts involved, and moreover, the work in winding the strings around the discs during sealing is difficult to be effected by automation. Similarly, in the practice of driving the staples into the flap covers by a stapler, although the sealing of the flap covers may be effected efficiently by the use of the stapler, it is necessary to pull the flap covers up with a considerable force for opening the packing case, with consequent breakage or damage to the flap covers, when the packing case is opened, and furthermore, the re-sealing of the packing case can not be effected by hand, but again requires the use of the stapler.

More specifically, referring to FIGS. 1 to 3 showing the conventional practice as described in the foregoing, in the arrangement of FIG. 1, for example, two pairs of small discs 4 and 5 are fixed to the flap covers 2 and 3 of a packing case 1 for winding strings 6 around the small discs 4 and 5, and in FIG. 2, staples 7 are applied by a stapler (not shown) to the flap covers 2 and 3 of the packing case 1 across the junction j therebetween, while in FIG. 3, the adhesive tape 8 is applied over the flap covers of junction j of the packing case 1 as shown.

Although the re-sealing is simply effected in the arrangement of FIG. 1, the strings 6 tend to come loose or come off the small discs during transit or handling of the packing case 1, while in FIGS. 2 and 3, the surfaces of the flap covers 2 and 3 are inevitably damaged and new staples or adhesive tape are required for re-sealing as mentioned earlier.

SUMMARY OF THE INVENTION

Accordingly, an essential object of the present invention is to provide a clamping device for use, for example, in packing which is capable of readily effecting sealing and permitting opening of flap covers of packing cases made of plate-like members such as corrugated boards, etc.

Another important object of the present invention is to provide a clamping device of the above described type which has a simple structure and is reliable in functioning.

A further object of the present invention is to provide a clamping device of the above described type which can be readily manufactured at low cost, for example, by one-piece molding of flexible synthetic resin, etc.

A still further object of the present invention is to provide a clamping device mounting apparatus which is capable of efficiently applying the clamping devices of the above described type to packing cases and the like.

In accomplishing these and other objects, according to one preferred embodiment of the present invention, there is provided a clamping device for clamping plate-like members such as corrugated boards of packing cases which comprises a base portion of flat shape made of flexible material, for example, polypropylene and the like, a pair of pivotal members integrally formed on the surface of said base portion through thin hinge portions, piercing pieces or claws integrally formed on the under surfaces of the respective pivotal members and extending outwardly from said under surfaces, and openings formed in said base portion in positions corresponding to said piercing pieces for permitting said piercing pieces to pass therethrough when said pivotal members are turned downwardly onto said base portion.

By the above arrangement, a clamping device capable of efficiently sealing and permitting easy opening of, for example, flap covers of packing cases has been advantageously provided as a simple structure and at consequent low cost, with substantial elimination of the disadvantages inherent in the conventional clamping devices of the kind.

BRIEF DESCRIPTION OF THE DRAWINGS

These and other objects and features of the present invention will become apparent from the following description of the preferred embodiments thereof given with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
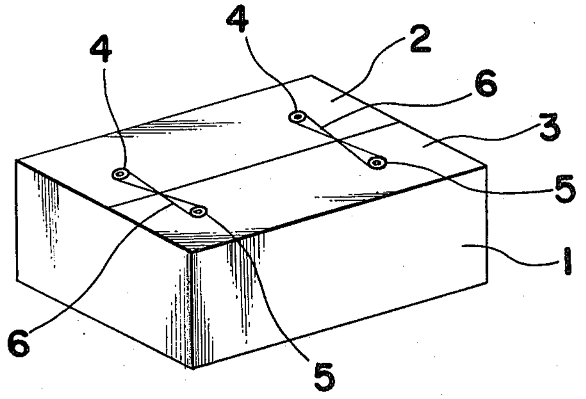
Fig. 1 PRIOR ART
FIGS. 1 to 3 are perspective view of packing cases to which conventional sealing means are applied (already referred to)
Figure 2:
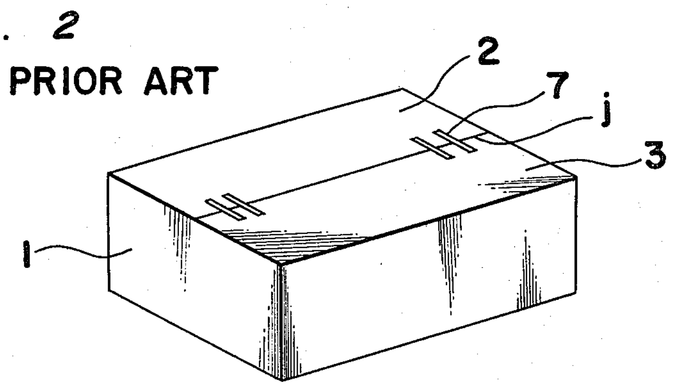
Fig. 2 PRIOR ART
Figure 3:
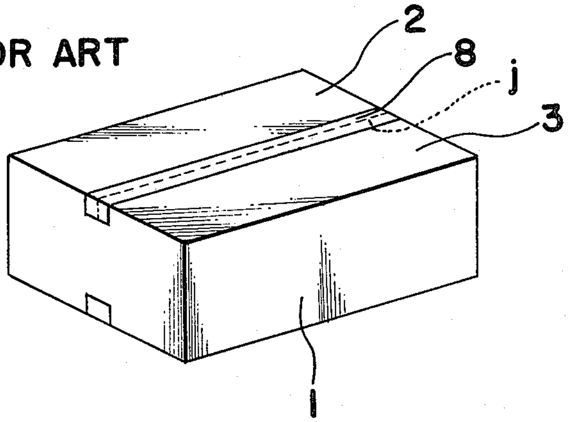
Fig. 3 PRIOR ART
Figure 4:
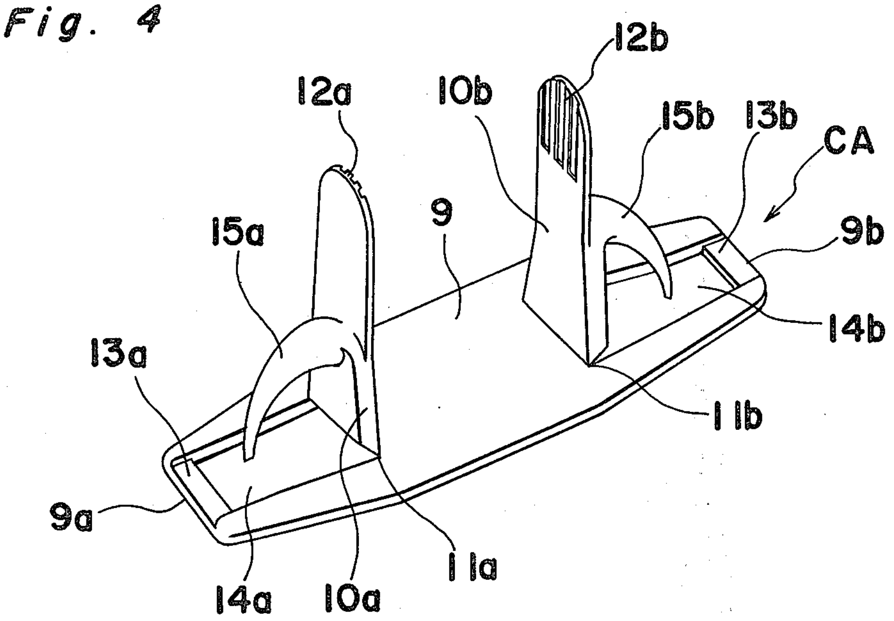
FIG. 4 is a perspective view showing, on an enlarged scale, the construction of a clamping device according to one preferred embodiment of the present invention.

Referring now to the drawings, there is shown in FIG. 4 a clamping device CA for plate-like members such as corrugated boards according to one preferred embodiment of the present invention. In FIG. 4, the clamping device CA formed by one-piece molding, for example, of flexible synthetic resin material such as polypropylene generally includes a flat base portion 9 and a pair of pivotal pieces **10*a* and 10*b* pivotally provided adjacent to the opposite ends 9*a* and 9*b* of the base portion 9 in symmetric relation with respect to the central portion of said base portion 9 as shown. The pivotal pieces 10*a* and 10*b* are connected to the base portion 9 by corresponding thin hinge portions 11*a* and 11*b* for pivotal movement therearound, while the distal free ends of the pivotal pieces 10*a* and 10*b* are sufficiently long to project beyond the opposite edges 9*a* and 9*b* of the base plate 9 to a predetermined extent when the pivotal pieces 10*a* and 10*b* are turned downwardly onto the base portion 9 so as to provide knobs or holding portions 12*a* and 12*b*. Meanwhile, the base portion 9 is provided with recesses 13*a* and 13*b* in positions corresponding to the pivotal pieces 10*a* and 10*b* for receiving said pivotal pieces 10*a* and 10*b*, with rectangular openings 14*a* and 14*b* being formed at the bottom portions of the recesses 13*a* and 13*b*. On the under surfaces of the respective pivotal pieces 10*a* and 10*b*, there are provided piercing pieces or claws 15*a* and 15*b* which are curved toward the central portion of the base portion 9 in the form of opposed arcs or horns and extending outwardly from said under surfaces in positions corresponding to said openings 14*a* and 14*b***.

Figure 5:
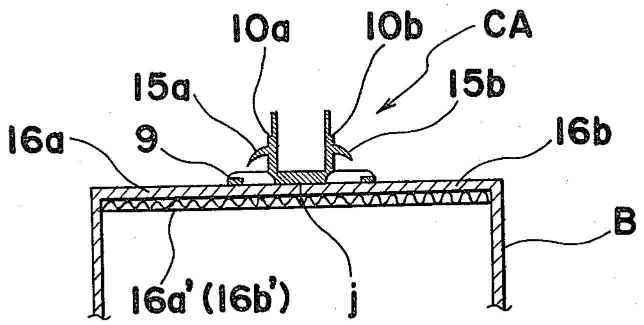
FIGS. 5 and 6 are cross sectional views for explaining the application of the clamping device of FIG. 4 to a packing case.
Figure 6:
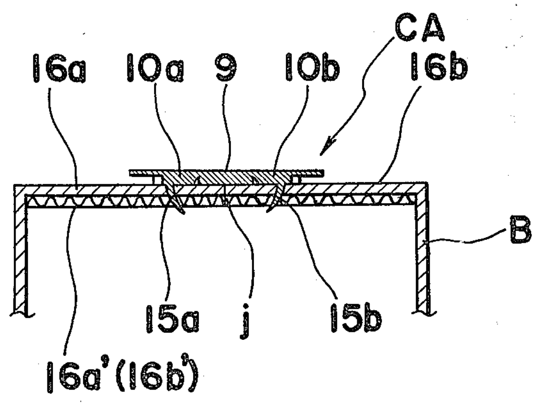
Figure 7:
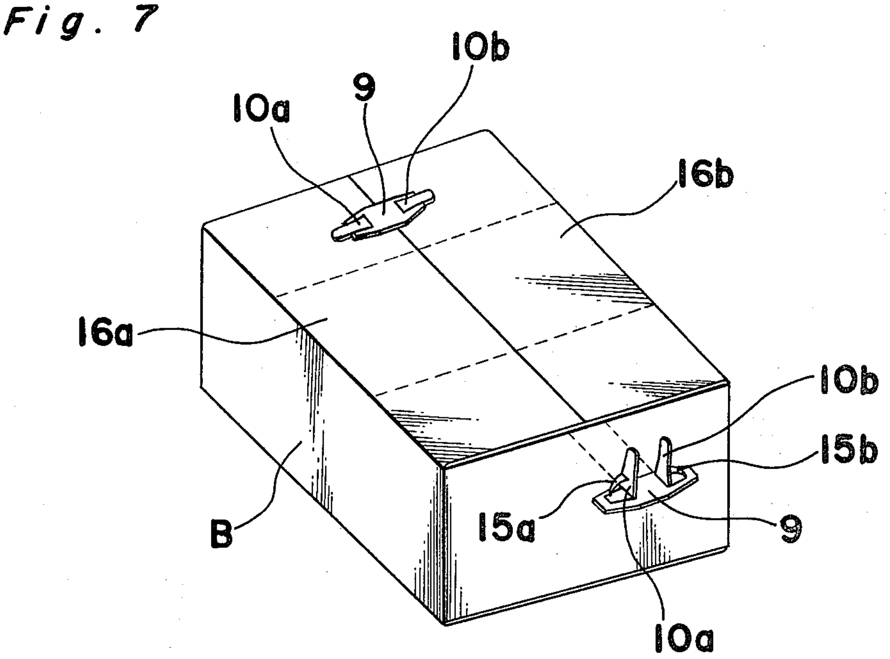
FIG. 7 is a perspective view of a packing case made of corrugated boards to which the clamping device of FIG. 4 is applied.

Referring to FIGS. 5 and 6, for application of the clamping device CA of FIG. 4, for example, for sealing of a packing case B, the clamping device CA is first applied onto the packing case B in a position across a junction j between flap covers **16*a* and 16*b* as shown in FIG. 5, and subsequently, the pivotal pieces 10*a* and 10*b* are turned downwardly or lowered, and then depressed for forcing the piercing pieces 15*a* and 15*b* through the flap covers 16*a* and 16*b*, and also auxiliary flap cover 16*a*′ or 16*b*′ provided under said flap covers 16*a* and 16*b* and extending inwardly from each side wall so as to cross the flap covers 16*a* and 16*b*. In the condition as described above, even if the flap covers 16*a* and 16*b* and 16*b* and 16*a*′ or 16*b*′ tend to move upwardly to the open position, such upward movement is prevented by the base portion 9 connected to each of the flap covers 16*a* and 16*b* and 16*a*′ or 16*b*′**, and thus, the packing case B is stably sealed as shown in FIG. 7.

It is to be noted here that in the foregoing embodiment and the embodiments that follow hereinbelow, although the description is mainly of the application of only one clamping device to the packing case, this has been done for clarity, and the number of the clamping devices actually used in practice may be increased depending on the need therefor.

For unsealing, when the pivotal pieces **10*a* and 10*b* are turned or raised upwardly by force exerted on the knobs 12*a* and 12*b* by fingers, the piercing pieces 15*a* and 15*b* are withdrawn from the flap covers 16*a* and 16*b* and also 16*a*′ or 16*b*′** to disengage the clamping device CA therefrom and consequently to release said flap covers. The re-sealing of the packing case B is readily effected by again applying the clamping device CA thereonto in the manner as described earlier.

As is seen from the foregoing description, according to the clamping device CA of the present invention, sealing and opening of packing cases can be effected in an extremely simple and efficient manner.

It should be noted here that in the foregoing embodiment, although the clamping device is mainly described with reference to sealing of packing cases, the concept of the clamping device of the present invention is not limited in its application to such sealing of packing cases alone, but is readily applicable to connection, addition and the like of a plurality of plate-like members or boards. It is further to be noted that if the plate-like members are composed of material other than corrugated boards, into which the piercing pieces **15*a* and 15*b* can not be readily caused to penetrate, such plate-like members should preferably be formed with suitable openings which permit reception of the piercing pieces 15*a* and 15*b*. It is to be further noted that, by forming the piercing pieces 15*a* and 15*b*** curved as described earlier with reference to FIG. 4, the clamping device CA is further prevented from disengagement in the vertical direction with respect to the plate-like members for better clamping.

Figure 8:
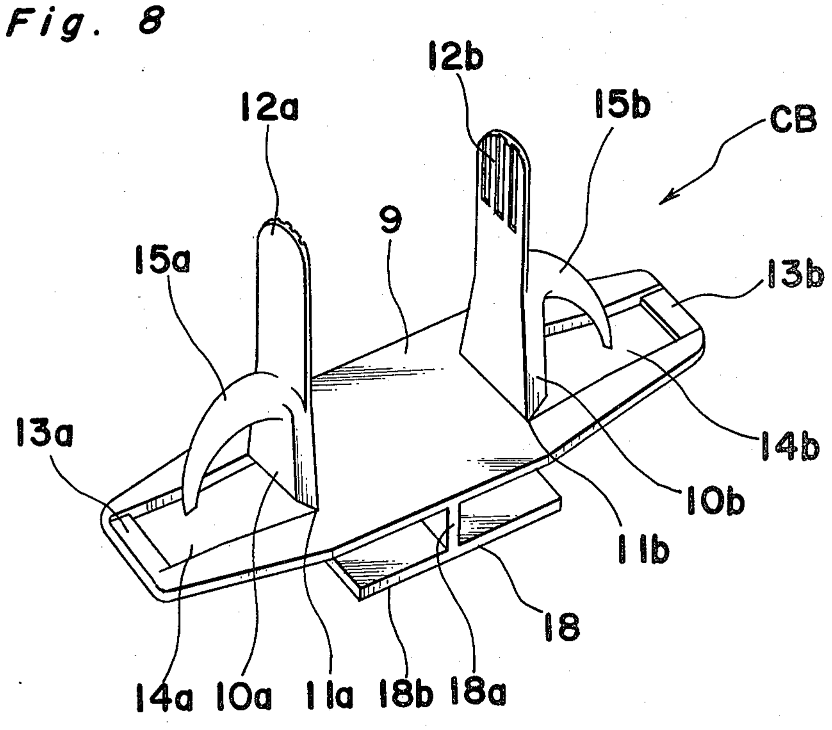
FIG. 8 is a view similar to FIG. 4, which particularly shows a first modification thereof.

Referring to FIGS. 8 to 12, there is shown in FIG. 8 a first modification of the clamping device CA of FIG. 4. In the modified clamping device CB of FIG. 8 which is intended to achieve a still more positive clamping by the clamping device, a lining plate 18 of T-shaped cross section including a stem portion **18*a* and a flat plate portion 18*b* is provided the stem portion 18*a* extending downwardly from the under surface of the central portion of the base portion 9 and the flat plate portion 18*b* thereof being on the lower end of the stem portion in parallel and spaced relation from the under surface of the stem portion 18*a***.

Figure 9:
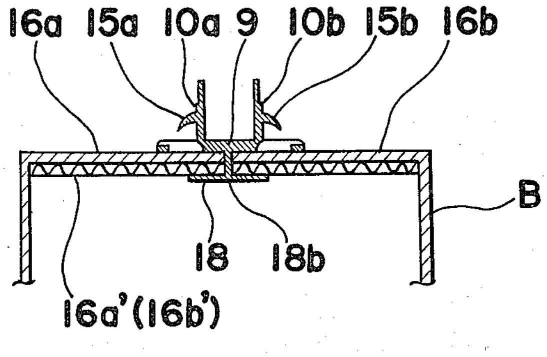
FIGS. 9 and 10 are cross sectional views for explaining the application of the modified clamping device of FIG. 8 to a packing case.
Figure 10:
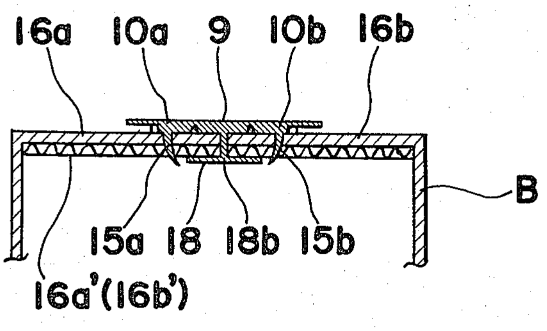
Figure 11:
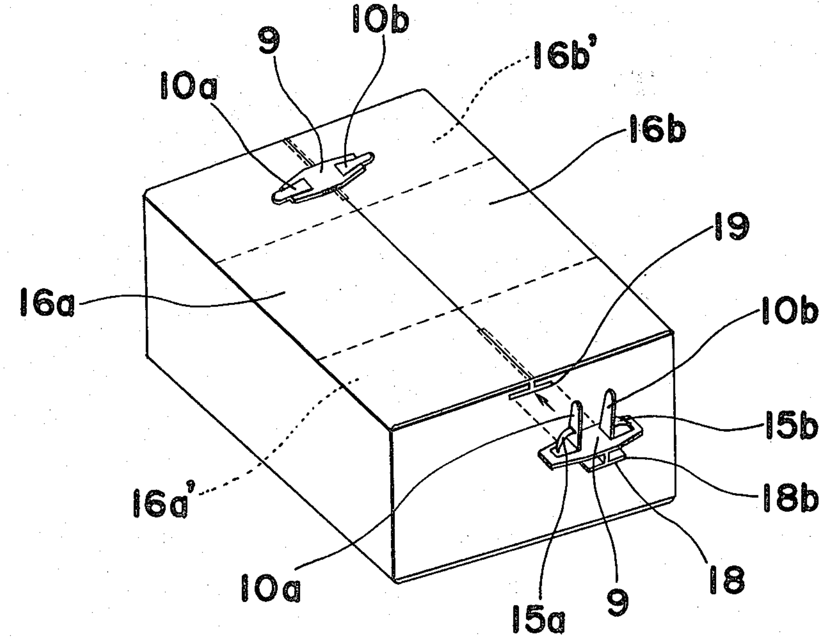
FIG. 11 is a perspective view of a packing case made of corrugated boards to which the modified clamping device of FIG. 8 is applied.
Figure 12:
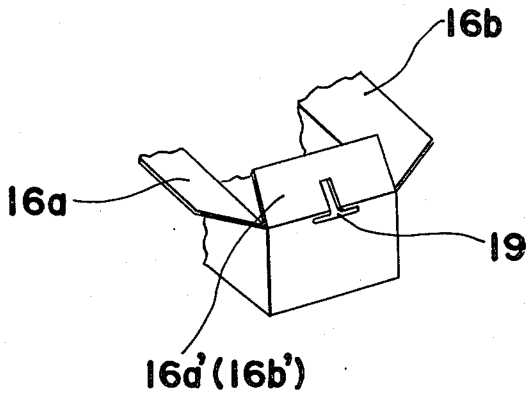
FIG. 12 is a fragmentary perspective view of a packing case specially constructed for application of the modified clamping device of FIG. 8.

For the application of the clamping device CB of FIG. 8 onto a packing case, the packing case B is preliminarily formed with a T-shaped insertion opening 19 extending from each side wall thereof to the auxiliary flap cover **16*a*′ or 16*b*′ integral with or connected to said side wall as is most clearly seen in FIG. 12 for insertion of the base portion 9 together with the lining plate 18 therethrough, so that corresponding portions of the auxiliary flap cover 16*a*′ or 16*b*′ and flap covers 16*a* and 16*b*, when folded together, are held in the space between the base portion 9 and the flat portion 18***b* of the clamping device CB, with the flat plate portion 18*b* contacting the under surface of the flap cover 16*a*' or 16*b*' as shown in FIGS. 9 and 10, and thus, not only is upward movement of the flap covers 16*a* and 16*b* and 16*a*' or 16*b*' further suppressed for a still more positive sealing, but the piercing pieces 15*a* and 15*b* are more readily penetrated through said flap covers upon depression of the pivotal pieces 10*a* and 10*b* for sealing.

Figure 13:
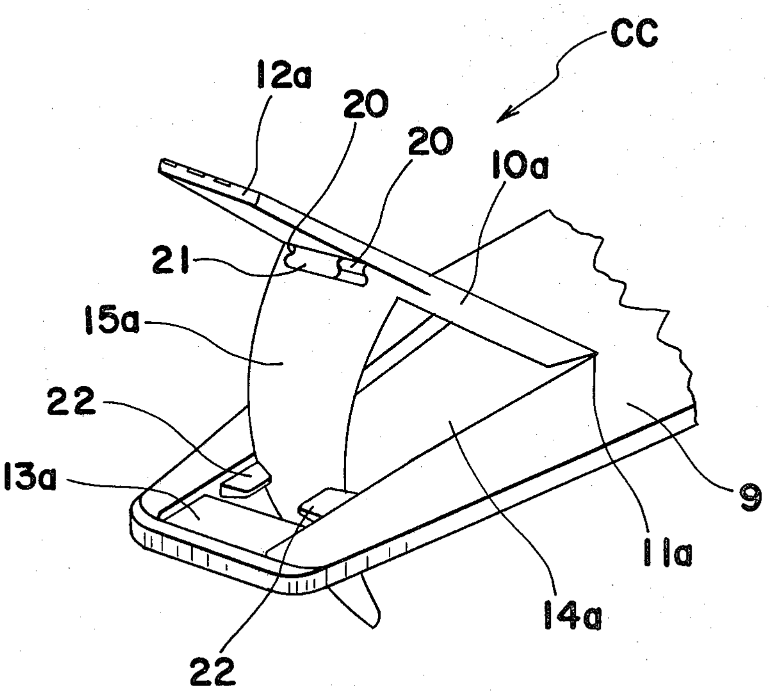
FIG. 13 is a fragmentary perspective view showing a second modification of the clamping device of FIG. 4.
Figure 14A:
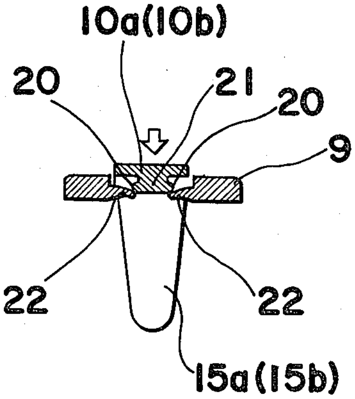
FIGS. 14(*a*) and 14(*b*) are cross sectional views for explaining the functioning of the modified clamping device of FIG. 13.
Figure 14B:
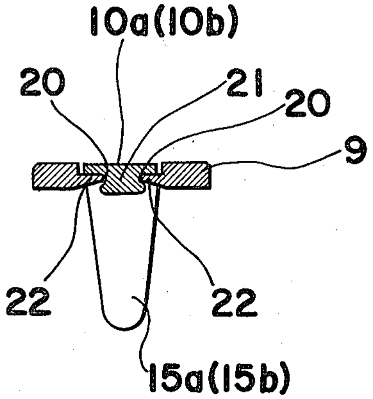

Referring to FIGS. 13 to 14(*b*), there is shown in FIG. 13 a second modification of the clamping device CB of FIG. 4. In the modified clamping device CC of FIG. 13, a projection 21, for example, of rectangular shape having engaging recesses 20 in the opposite side edges the under surface of each of the pivotal pieces 10*a* and 10*b* and projects from the under surface thereof in a position adjacent to the piercing piece 15*a* or 15*b*, and a pair of opposed engaging protrusions 22 are provided on the inner side edge of each of the recesses 13*a* and 13*b* of the base portion 9 in positions corresponding to the recesses 20 of the projection 21 as shown. Accordingly, when the pivotal pieces 10*a* and 10*b* are turned downwardly or lowered and depressed to force the piercing pieces 15*a* and 15*b* through the flap covers 16*a* and 16*b* and 16*a*' or 16*b*' for sealing as in FIG. 14(*a*), the distal ends of the opposed engaging protrusions 22 are engaged in the engaging recesses 20 at the opposite edges of the projection 21 for locking the pivotal pieces 10*a* and 10*b* as shown in FIG. 14(*b*), and thus, the clamping device CC is more stably secured to the packing case B.

Figure 15:
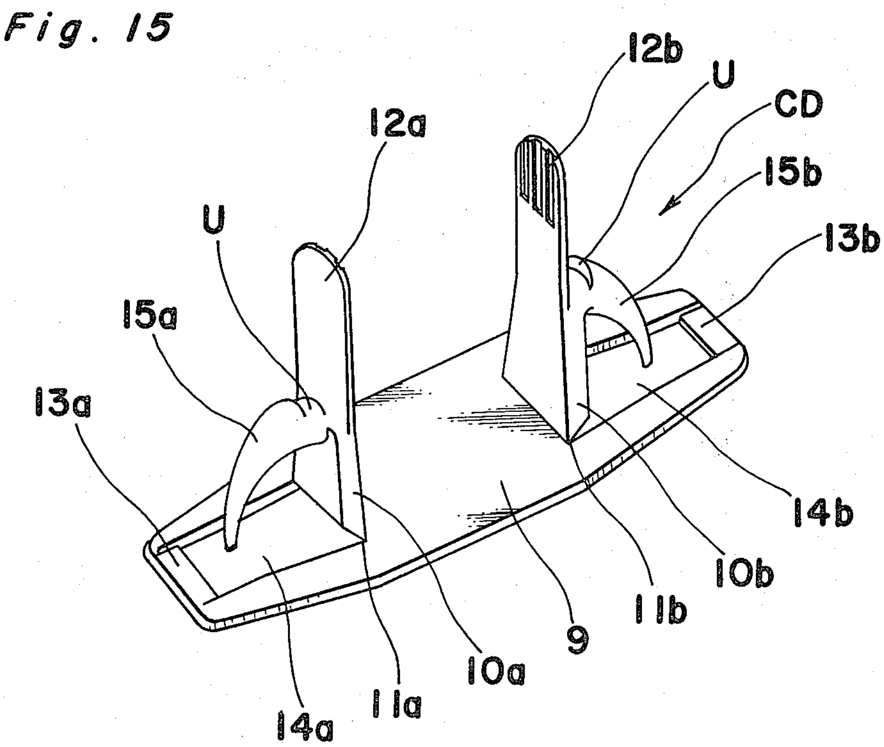
FIG. 15 is a view similar to FIG. 4, which particularly shows a third modification thereof.
Figure 16A:
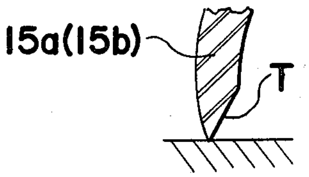
FIGS. 16(*a*), 16(*b*) and 17 are fragmentary cross sectional views for explaining the functioning of a clamping device according to a fourth modification of the clamping device of FIG. 4.
Figure 16B:
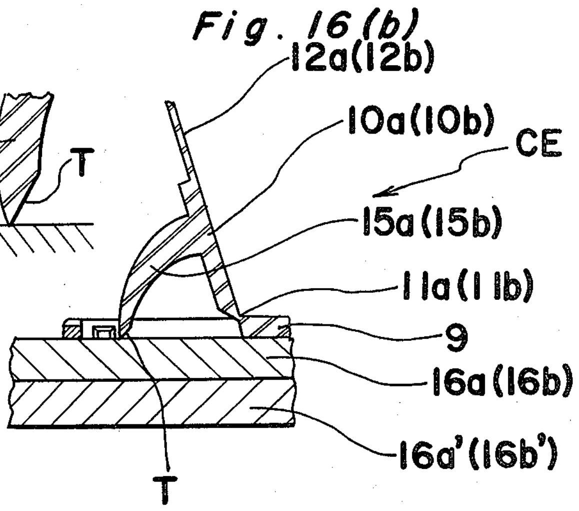
Figure 17:
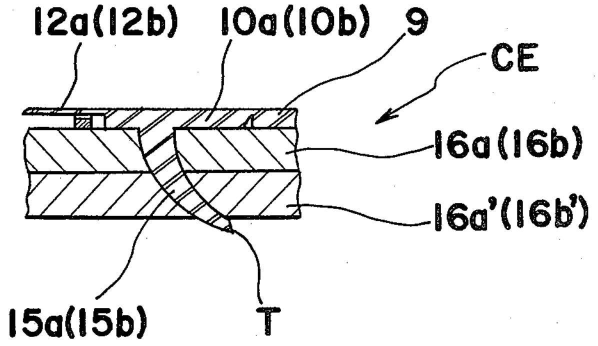

Referring to FIGS. 15 to 17 showing third and fourth modifications of the clamping device CA of FIG. 4, in the modified clamping device CD of FIG. 15, each of the piercing pieces 15*a* and 15*b* is further provided, at its base portion close to the under surface of the pivotal piece 10*a* or 10*b*, a stepped recess U as shown, with the width of the stepped recess U being approximately equal to the sum of the thicknesses of the flap covers 16*a* and 16*a*' or 16*b* and 16*b*'. When the clamping device CD of FIG. 15 is applied to a packing case, and the piercing pieces 15*a* and 15*b* are forced through the flap covers of the packing case, the peripheral edges of the openings formed in the flap covers are engaged in the stepped recesses U to prevent the piercing pieces from slipping off the flap covers for a better securing of the clamping device CD.

Figure 18:
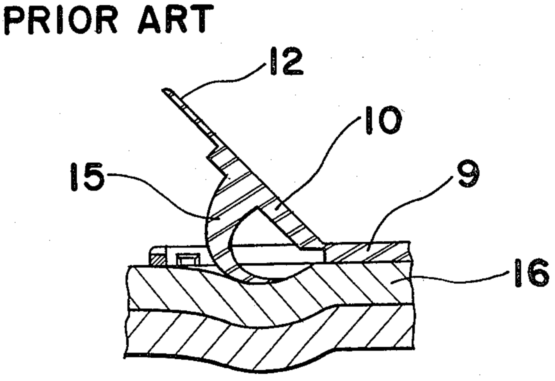
Fig. 18 PRIOR ART
FIG. 18 is a fragmentary cross sectional view for explaining of the functioning of a conventional piercing claw.

In the modified clamping device CE of FIGS. 16(*a*) to 17 each of the piercing pieces 15*a* and 15*b* is provided at its tip with an inclination or tapered portion T the surface of which is so directed as to be approximately at right angles with respect to the surface of the plate-like members i.e. flap covers 16*a* and 16*b* and 16*a*' or 16*b*'. It is to be noted that when a clamping device is made, for example, of polypropylene, the conventional practice of merely pointing or tapering the tips of the piercing pieces for facilitated insertion thereof results in bending at the tip portions of the piercing pieces, thus making it difficult to easily force the piercing pieces through the flap covers as is seen from FIG. 18. On the contrary, when the inclination or tapered portion T according to the present invention is provided in the manner as described with reference to FIG. 16, the piercing pieces 15*a* and 15*b* are efficiently penetrated through the flap covers 16*a* and 16*b* and 16*a*' or 16*b*' since the tapered portions T are directed approximately perpendicular to the surfaces of said flap covers as shown in FIGS. 16(*a*) to 17, so that the disadvantage of the conventional shape of the pointed tip as shown in FIG. 18 is advantageously eliminated.

Figure 19:
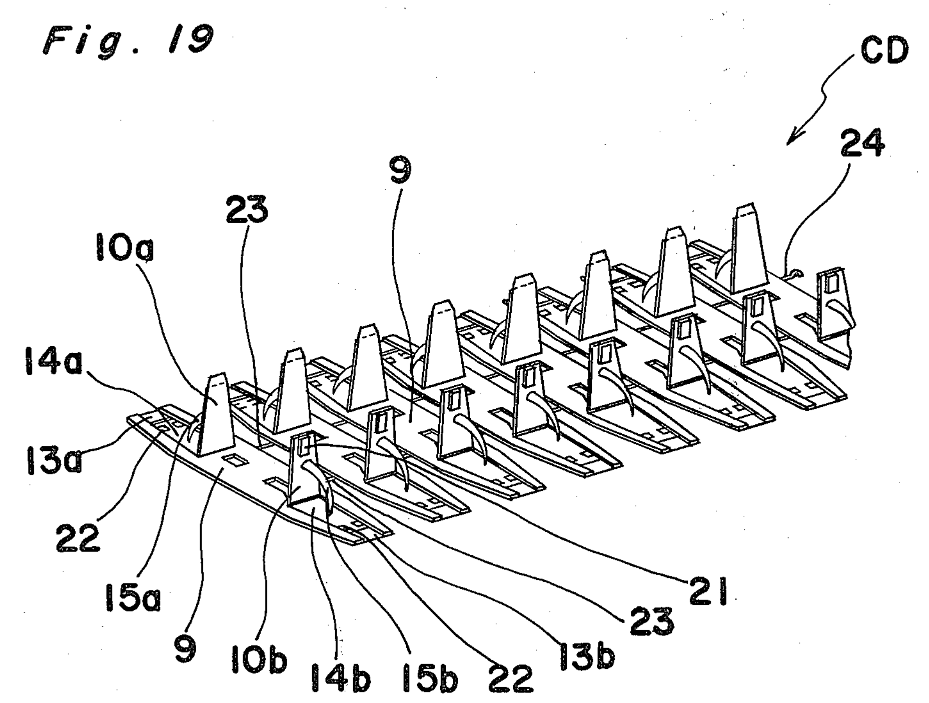
FIG. 19 is a perspective view of a clamping device according to a modification of the device of FIG. 13.

Referring to FIG. 19, there is shown a fifth modification of the clamping device according to the present invention. In FIG. 19, a plurality of the clamping devices CA, CB, CC, CD or CE described in the foregoing, for example, the clamping device CC of FIG. 13 laterally aligned in spaced relation to each other are connected together by a pair of wire-like connecting members 23 suitably fixed to the under surfaces of the base portions 9 of the clamping devices CC to form one lot or group CD, with each of the connecting members 23 being formed with an engagement portion or hook 24 at one end of the group CD for connection with another similar group of clamping devices.

The arrangement of FIG. 19 is particularly advantageous in that a continuous supply of the clamping devices is possible for efficient operation when the clamping devices are to be automatically applied to packing cases and the like by a mounting apparatus to be described below.

Referring to FIGS. 20 to 23, there is shown a clamping device mounting apparatus M according to one preferred embodiment of the present invention.

Figure 20:
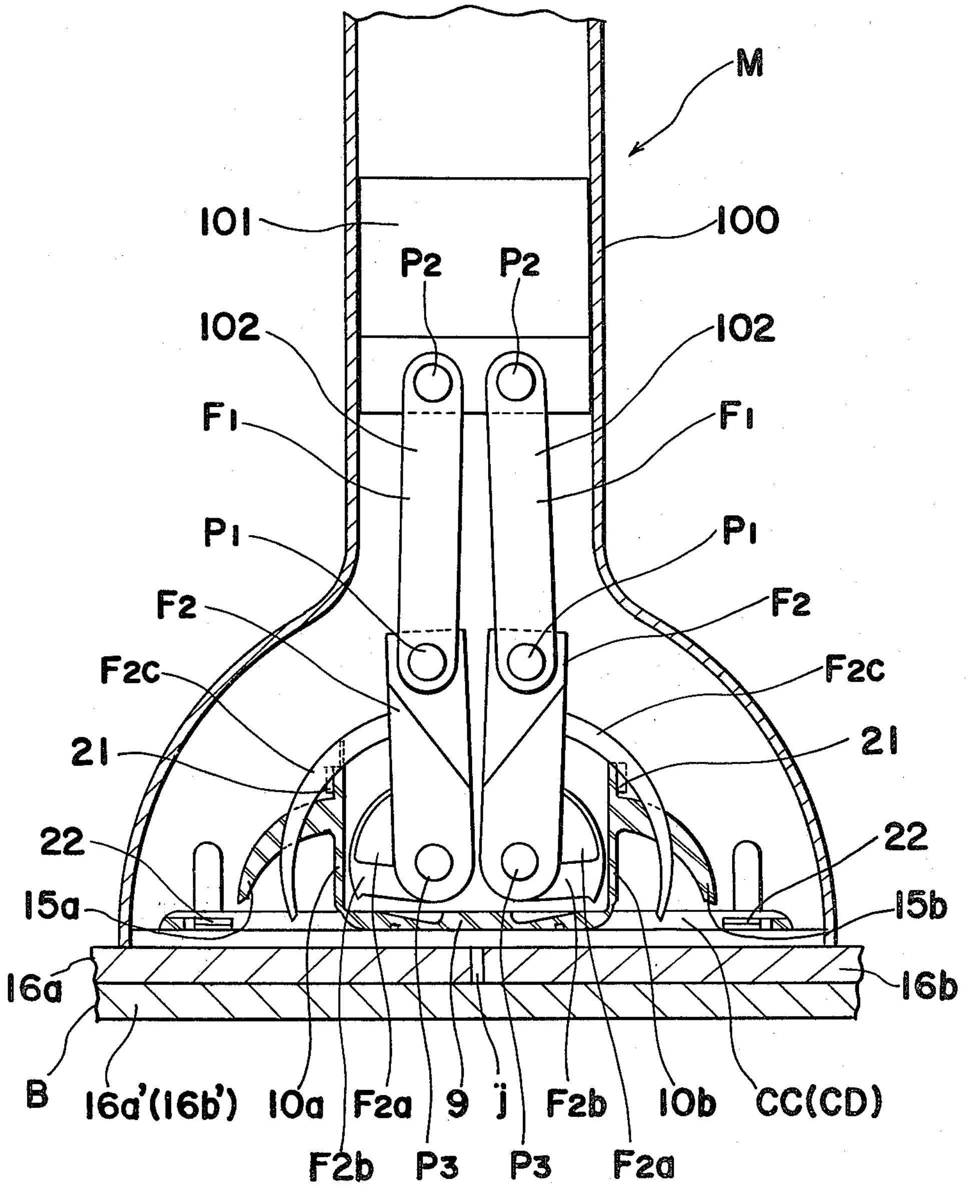
FIGS. 20 to 22 are front sectional views for explaining the functioning of a clamping device mounting apparatus according to the present invention.
Figure 21:
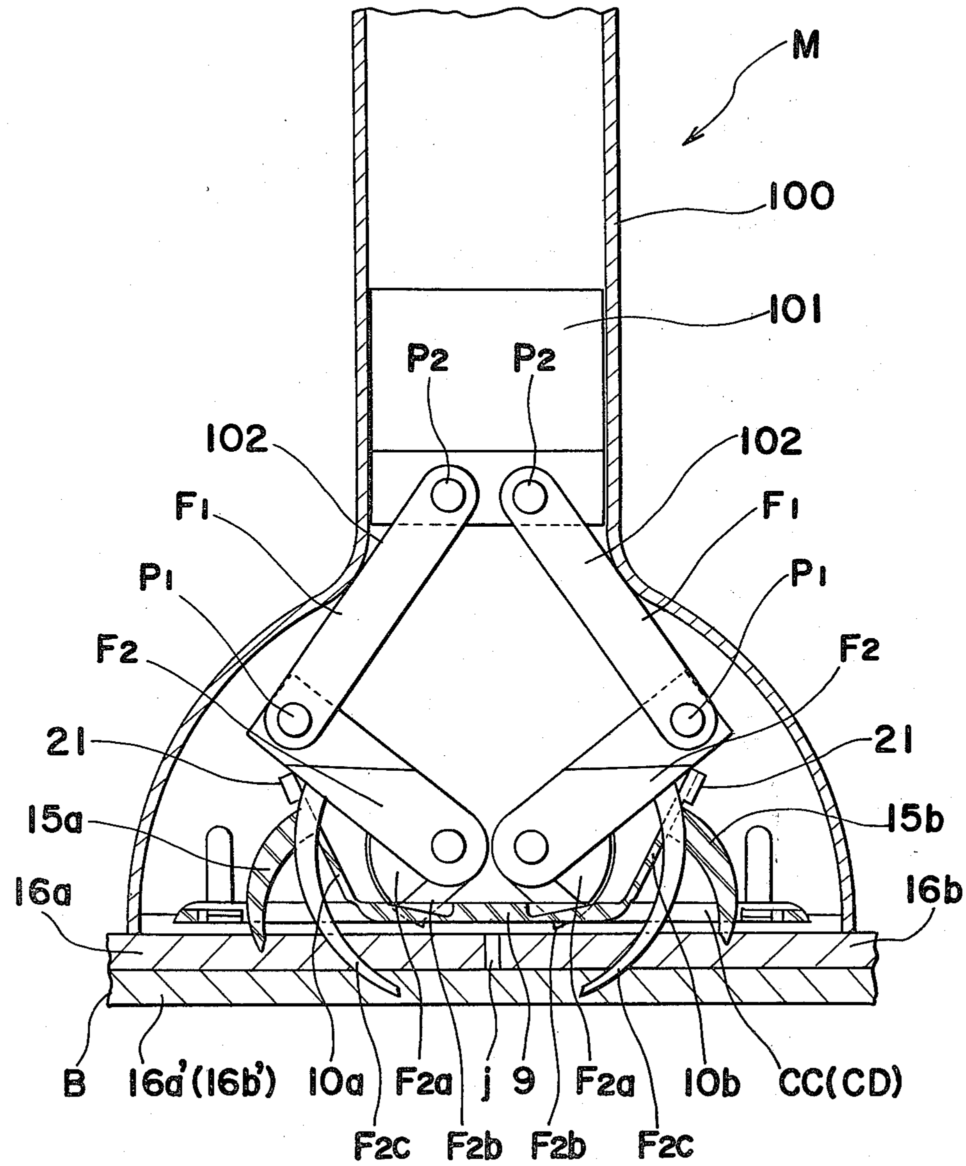

In FIG. 20, the clamping device mounting apparatus M generally includes a main frame or housing 100, a slider member 101 slidably accommodated in the housing 100 for vertical movement either manually or by suitable driving means such as an air cylinder (not shown), and a pair of articulated connecting arms 102 each of which is constituted by arm members F1 and F2 pivotally connected at corresponding ends by a pin P1 with the other upper end of the arm member F1 pivotally connected to the slider member 101 by a pin P2, while the other lower end of the arm member F2 is also coupled to the housing 100 at a pivotal point P3 as shown, so that when the slider member 101 moves downward in FIG. 20, each of the connecting arms 102 is bent outwardly as shown in FIG. 21. The lower arm members F2 of the connecting arms 102 which function as rocking members are respectively provided with pressing pieces F2*a*, cutter members F2*b* and flap cover piercing and holding claws F2*c* laterally, outwardly extending from the arm members F2 as shown. Each of the cutter members F2*b* is provided with a cutting blade at its lower edge and is disposed in a position ahead of the pressing piece F2*a* in the direction of rotation and at the outside of the pressing piece F2*a* in the widthwise direction of the arm member F2. Each of the flap cover piercing and holding claws F2*c* in the form of opposed arcs or horns and curved toward the central axis of the housing 100 has its tip located in a position ahead of the cutter member F2*b* in the rotational direction and at the outermost position in the widthwise direction of the arm member F2.

The housing 100 is further coupled to a clamping device feeding mechanism to be described hereinbelow with reference to FIG. 23.

Figure 23:
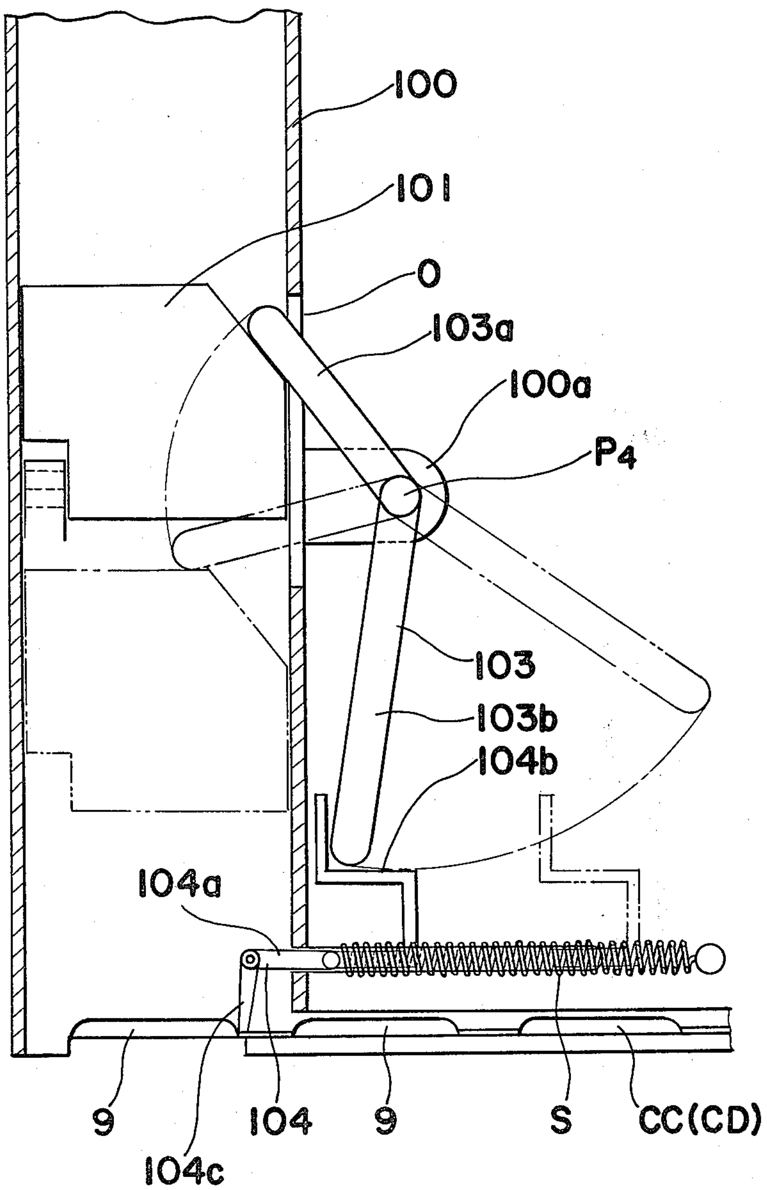
FIG. 23 is a side sectional view of the clamping device mounting apparatus of FIGS. 20 to 22.

In FIG. 23, the clamping device feeding mechanism generally includes a feeding lever 104 and an actuator lever 103 bent at approximately the central portion thereof to a predetermined angle so as to form an upper portion 103*a* and a lower portion 103*b*, and pivotally connected at the bent portion to a bracket 100*a* on the housing 100 by a pin P4, with the upper end of the portion 103*a* of the lever 103 contacting the upper slanted surface of the slider member 101 through a suitable opening O formed in the housing 100. Accordingly, upon vertical movement of the slider member 101, the actuator lever 103 is rotated about the pin P4, causing rocking movement of the lower end of the portion 103*b*. The feeding lever 104 is horizontally disposed at the lower portion of the housing 100, and is guided, at its forward end portion 104*a* having a feeding claw 104*c*, through a corresponding opening formed in the housing 100, and is normally urged in a direction to be withdrawn from the housing 100 i.e. rightward in FIG. 23, by a spring S connected between the other end of the lever 104 and a frame (not shown) of the apparatus. The feeding lever 104 is further provided with an engaging piece 104*b* of L-shaped cross section projecting upwardly therefrom which engages the lower end of the portion 103*b* and driven thereby as the actuator lever 103 is rotated about the pin P4 in the above described manner.

By the above arrangement, in the state shown in FIG. 20, the clamping device mounting apparatus M of the present invention is positioned on the flap covers 16*a* and 16*b* of a packing case B, with the clamping device, for example, the clamping device CC of FIG. 13 (in the form of group CD in FIG. 19) being guided thereby. Under the above condition, the base portion 9 of the clamping device CC is positioned to cross the junction j between the corresponding edges of the flap covers 16*a* and 16*b*, with the pivotal pieces 10*a* and 10*b* thereof standing vertically and the piercing pieces 15*a* and 15*b* spaced from the flap covers 16*a* and 16*b*. The clamping device mounting apparatus M has the slider member 101 at the raised position, while the articulated connecting arms 102 thereof extend straight, and the pressing pieces F2*a*, cutter members F2*b* and flap cover piercing and holding claws F2*c* are not functioning with respect to the clamping device CC.

Subsequently, as the slider member 101 descends, the connecting arms 102 are each folded outwardly to a certain extent as shown in FIG. 21, whereby the flap cover piercing and holding claws F2*c* located at the most leading positions with respect to the rotational direction of the lower arm members F2 of the connecting arms 102 are first forced into the flap covers 16*a* and 16*b* and 16*a'* and 16*b'* thereunder at the side of the clamping device CC for collecting together and holding said flap covers so as to maintain the clamping device CC stable against depression.

Figure 22:
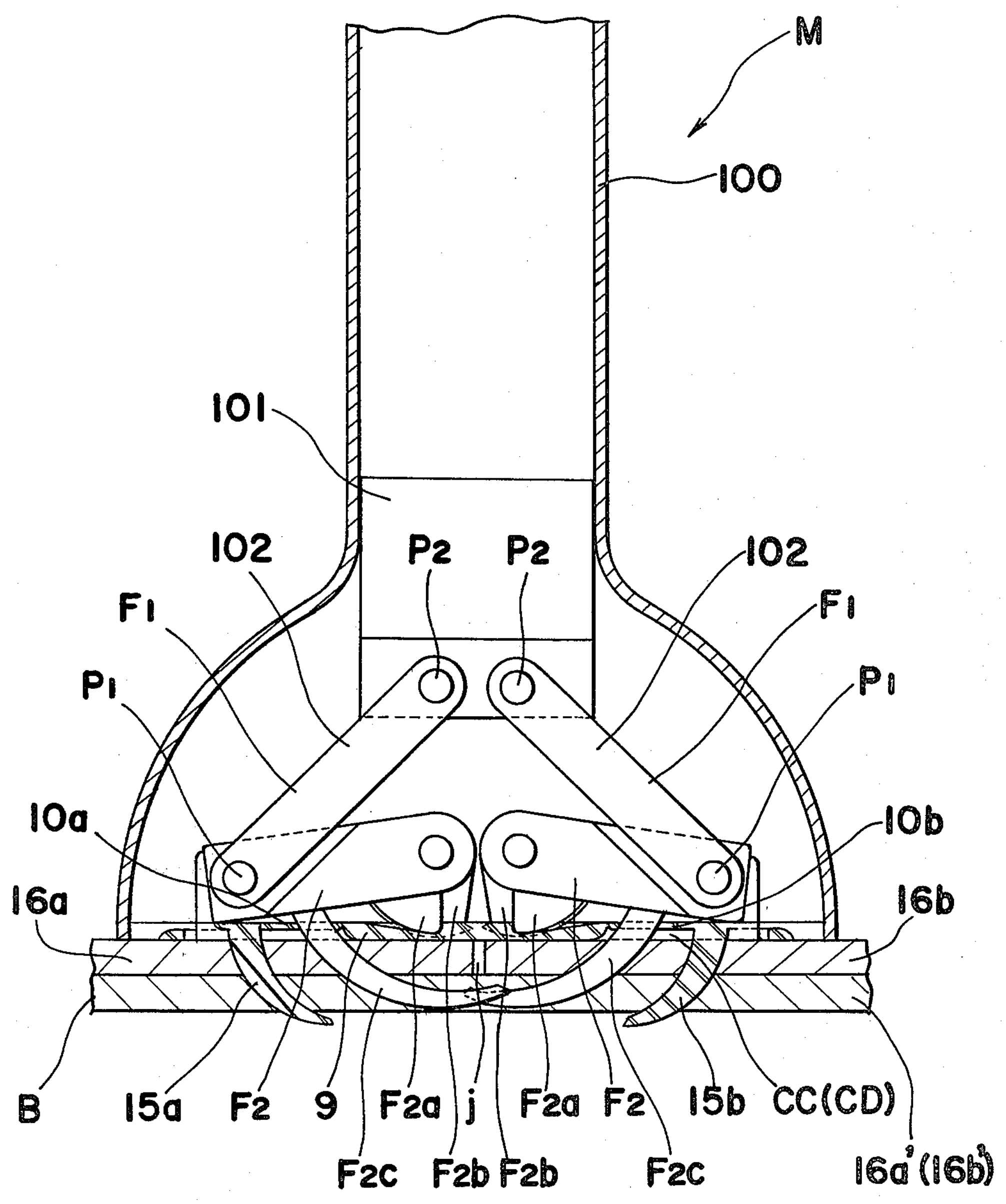

Upon further descent of the slider member 101 each of the connecting arms 102 is further folded as shown in FIG. 22, and the cutter members F2*b* cut off the connecting members 23 (FIG. 19) of the group CD of the clamping devices at the side of the clamping device CC, while the pressing pieces F2*a* press against the upper surface of the base portion 9 of the clamping device CC. Simultaneously, the lower arm members F2 of the connecting arms 102 function to push downwardly the forward ends of the pivotal pieces 10*a* and 10*b* of the clamping device CC. Accordingly, the piercing members 15*a* and 15*b* extending downwardly from the under surfaces of the pivotal pieces 10*a* and 10*b* are forced through the flap covers 16*a* and 16*b* and 16*a'* or 16*b'*, and thus, the clamping device CC is fixed onto said flap covers.

In the state as described above, since the projections 21 of the pivotal pieces 10*a* and 10*b* engage the engaging projections 22 of the base portion 9 as described earlier with reference to FIG. 13, the upward movement of the pivotal pieces 10*a* and 10*b* is positively prevented.

Upon completion of mounting of the clamping device CC in the above described manner, the slider member 101 ascends and the connecting arms 102 are extended straight, and thus, the flap cover piercing and holding claws F2*c*, cutter members F2*b* and pressing members F2*a* are all spaced from the flap covers 16*a* and 16*b* and 16*a'* or 16*b'* and also from the clamping device CC to return to the state shown in FIG. 20 in preparation for a subsequent clamping device mounting operation.

In the foregoing operations, the clamping devices CC connected to each other by the connecting members 23 as described with reference to FIG. 13 are arranged to be forwarded one by one to the predetermined position of the housing 100 through one reciprocation of the slider member 26.

More specifically, in FIG. 23, the actuator lever 103 is pivoted clockwise following the upward movement of the slider member 26, and the lower portion 103*b* of the lever 103 drives the feeding lever 104 leftward in FIG. 23 through the engaging piece 104*b* of the feeding lever 104. By the above movement of the feeding lever 104, the feeding claw 104*c* provided at the forward end of the lever 104 feeds the leading one of the clamping devices CC into the housing 100. Subsequently, as the slider member 101 descends, the actuator lever 103 is rotated in the counterclockwise direction, whereby the lower end of the portion 103*b* of the lever 103 is disengaged from the engaging piece 104*b* of the feeding lever 104, and thus, the feeding claw 104*c* together with the feeding rod 104 is moved rightward by the urging force of the spring S in preparation for feeding the subsequent clamping device.

As is clear from the foregoing description, the clamping device mounting apparatus according to the present invention is extremely effective for mounting clamping devices provided with the pivotal pieces having the piercing pieces, and makes it possible to achieve continuous mounting as well as positive mounting of the clamping devices for sealing of packing cases and the like at a high efficiency.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A clamping device for clamping plate-like members together which comprises: a flat base portion of flexible material, a pair of flat pivotal members having thin hinge portions joining said pivotal members to said base portion, piercing members on the surfaces of said pivotal members which, when said pivotal members are pivoted away from one surface of said base portion, project toward said one surface, said base portion having openings therein in positions for allowing said piercing members to pass therethrough when said pivotal members are pivoted into substantially coplanar relation with said one surface of said base plate, the free ends of each of said pivotal members having projecting portions having a thickness less than the thickness of said pivotal members and extending away from said hinge portions and coplanar with the surfaces of said pivotal members which are on the opposite sides thereof from the surfaces from which said piercing members project, and which, when said pivotal members are pivoted into substantially coplanar relation with said one surface of said base plate, are spaced from the level of the other surface of said base plate in the direction of said one surface of said base plate to leave a free space beneath said projections for enabling the finger of a user to be engaged with the projections to pivot said pivotal members away from said base plate.

2. A clamping device as claimed in claim 1, wherein said flexible material is polypropylene.

3. A clamping device as claimed in claim 1, wherein said base portion further has a lining plate having a T-shaped cross section projecting from the central portion of the other surface of said base portion with the cross portion of said plate in parallel and spaced relation with said other surface.

4. A clamping device as claimed in claim 1, wherein said piercing members on said respective surfaces of said pivotal members are curved toward the central portion of said base portion in the form of opposed arcs.

5. A clamping device as claimed in claim 4, wherein said piercing members each have inclined portions at the tip portions thereof so that said tip portions are directed approximately at right angles with respect to the surface of the plate-like members into which said piercing members are caused to penetrate.

6. A clamping device as claimed in claim 1 in which said pivotal members each have a further projection thereon projecting in the same direction as said piercing members and having laterally opening recesses therein, and the edges of said openings in said base plate have projections thereon which, when said pivotal members are pivoted into coplanar relation with said one surface of said base plate, engage in said recesses for holding said pivotal members in said substantially coplanar relation.

7. A clamping device as claimed in claim 1 in which said piercing members each have at the base thereof adjacent the pivotal member from which they project a recess, and the edge of the corresponding opening in said base portion engages in said recess when said pivotal member is pivoted into the substantially coplanar relationship with said base member.

8. An assembly of clamping devices for clamping plate-like members together, which comprises: a plurality of clamping devices each having a flat base portion of flexible material, a pair of pivotal members having thin hinge portions joining said pivotal members to said base portion, piercing members on the surfaces of said pivotal members which, when said pivotal members are pivoted away from one surface of said base portion, project toward said one surface, said base portion having opening therein in positions for allowing said piercing members to pass therethrough when said pivotal members are pivoted into substantially coplanar relation with one surface of said base plate, the free ends of each of said pivotal members having projecting portions having a thickness less than the thickness of said pivotal members and extending away from said hinge portions and co-planar with the surfaces of said pivotal members which are on opposite sides thereof from the surfaces from which said piercing members project, and which, when said pivotal members are pivoted into substantially coplanar relation with said one surface of said base plate, are spaced from the level of the other surface of said base plate to leave a free space beneath said projections for enabling the finger of a user to be engaged with the projections to pivot said pivotal members away from said base plate, and easily separable means to which said clamping devices are connected in side by side spaced relationship for feeding said clamping devices to an apparatus for successively applying said clamping devices to an article to be clamped.

* * * * *